United States Patent [19]
Zehren

[11] 3,826,525
[45] July 30, 1974

[54] WELL PUMP TORQUE ABSORBER ASSEMBLY

[75] Inventor: James N. Zehren, Bartlesville, Okla.

[73] Assignee: TRW, Inc., Cleveland, Ohio

[22] Filed: Aug. 27, 1971

[21] Appl. No.: 175,634

[52] U.S. Cl. ............. 285/223, 64/27 NM, 285/363
[51] Int. Cl. ............................................ F16l 27/00
[58] Field of Search ............ 285/114, 49, 231, 223, 285/302, 224, 225, 363; 64/27 NM

[56] References Cited
UNITED STATES PATENTS

| | | | |
|---|---|---|---|
| 2,438,312 | 3/1948 | Bunn et al. | 285/302 X |
| 2,620,165 | 12/1952 | Crickmer | 64/27 NM X |
| 2,932,179 | 4/1960 | Grant | 64/27 NM X |
| 2,950,129 | 8/1960 | Schaefer | 285/49 |
| 3,168,334 | 2/1965 | Johnson | 285/223 X |
| 3,190,680 | 6/1965 | Maly | 285/49 |
| 3,194,589 | 7/1965 | Kahlbau et al. | 285/231 X |

FOREIGN PATENTS OR APPLICATIONS

| | | | |
|---|---|---|---|
| 542,208 | 12/1941 | Great Britain | 285/231 |
| 865,271 | 2/1941 | France | 285/114 |

Primary Examiner—Thomas F. Callaghan
Attorney, Agent, or Firm—Shapiro and Shapiro; G. Mallet Prevost

[57] ABSTRACT

A torque absorber assembly for use with a conventional centrifugal pump installation for liquid producing wells which are of insufficient depth to accommodate a normal liquid discharge pipe of a length to provide the required absorption of torque produced by the pump in operation. The assembly comprises a series of annular rubber-like disc rings which are arranged in concentric superposed relation and surround a relatively short discharge extension leading from the pump discharge head. The disc rings are mounted between upper and lower circular flange plates, the lower plate being affixed to and extending radially from a discharge extension pipe leading from the pump discharge head and the upper plate being affixed to and extending radially from an adapter depending from and attached to the lower end of the main well discharge line leading to ground level. A series of bolts having threaded tightening nuts, extend through the plates and the intervening disc rings for adjusting the degree of friction between the disc rings and retaining the disc rings in the proper relation. The entire assembly is enclosed within a cylindrical housing secured to the lower disc ring supporting plate.

4 Claims, 2 Drawing Figures

PATENTED JUL 30 1974   3,826,525

INVENTOR
JAMES N. ZEHREN
BY [signature]
ATTORNEY

WELL PUMP TORQUE ABSORBER ASSEMBLY

BACKGROUND OF THE INVENTION

Normally, in the use of centrifugal pumping installations, the wells are of sufficient depth to accommodate a discharge pipe connected to the pump discharge head, of a length to provide absorption of the torque created by the operation of the centrifugal pump. However, in certain installations, wells are of insufficient depth to accommodate a discharge pipe long enough to absorb this torque.

It is therefore the object of the present invention to provide a torque absorber assembly for use in those instances where the well is of a depth which precludes the use of a relatively long discharge pipe.

Another object of the invention is to provide a torque absorber assembly comprising a series of annular rubber-like disc rings surrounding the discharge line and secured between upper and lower annular flange plates, the lower plate being affixed to and extending radially from a discharge extension pipe leading from the pump discharge head, and the upper plate being affixed to and extending radially from an adapter which is affixed to the main discharge pipe leading to the ground level.

A further object is to provide an assembly of this nature, wherein the main discharge line and the pump discharge head extension pipe are capable of limited relative rotational movement through a torque absorber comprising a series of superposed rubber-like disc rings, held between upper and lower flange plates respectively affixed to the main discharge line and the pump discharge head extension pipe.

With the above and other objects in view which will appear as the description proceeds, the invention consists in the novel features herein set forth, illustrated in the accompanying drawings, and more particularly pointed out in the appended claims.

THE DRAWINGS

Referring to the drawings in which numerals of like character designate similar parts throughout both views:

FIG. 1 is an assembly view showing the well casing in section and the torque absorber assembly installed in the discharge line leading from the well pump; and FIG. 2 is an enlarged sectional view through the torque absorber assembly taken on line 2—2 of FIG. 1.

DETAILED DESCRIPTION OF THE INVENTION

Figure 1:
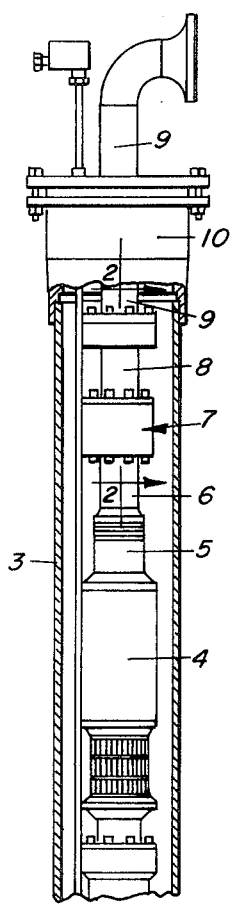

In the drawings, referring first to FIG. 1, 3 represents a conventional well casing within which is located a centrifugal pump 4 having a pump discharge head 5. Connected to the discharge head 5 is a relatively short pump discharge extension pipe 6, the torque absorber assembly of the present invention generally indicated by the numeral 7 being interposed between the pump extension pipe 6 and an adapter tube 8 which depends from and is connected to the main discharge line 9 leading to ground level, line 9 and tube 8 together constituting a main discharge pipe. The usual tubing head 10 encloses the upper or discharge end of the well casing at ground level.

Figure 2:
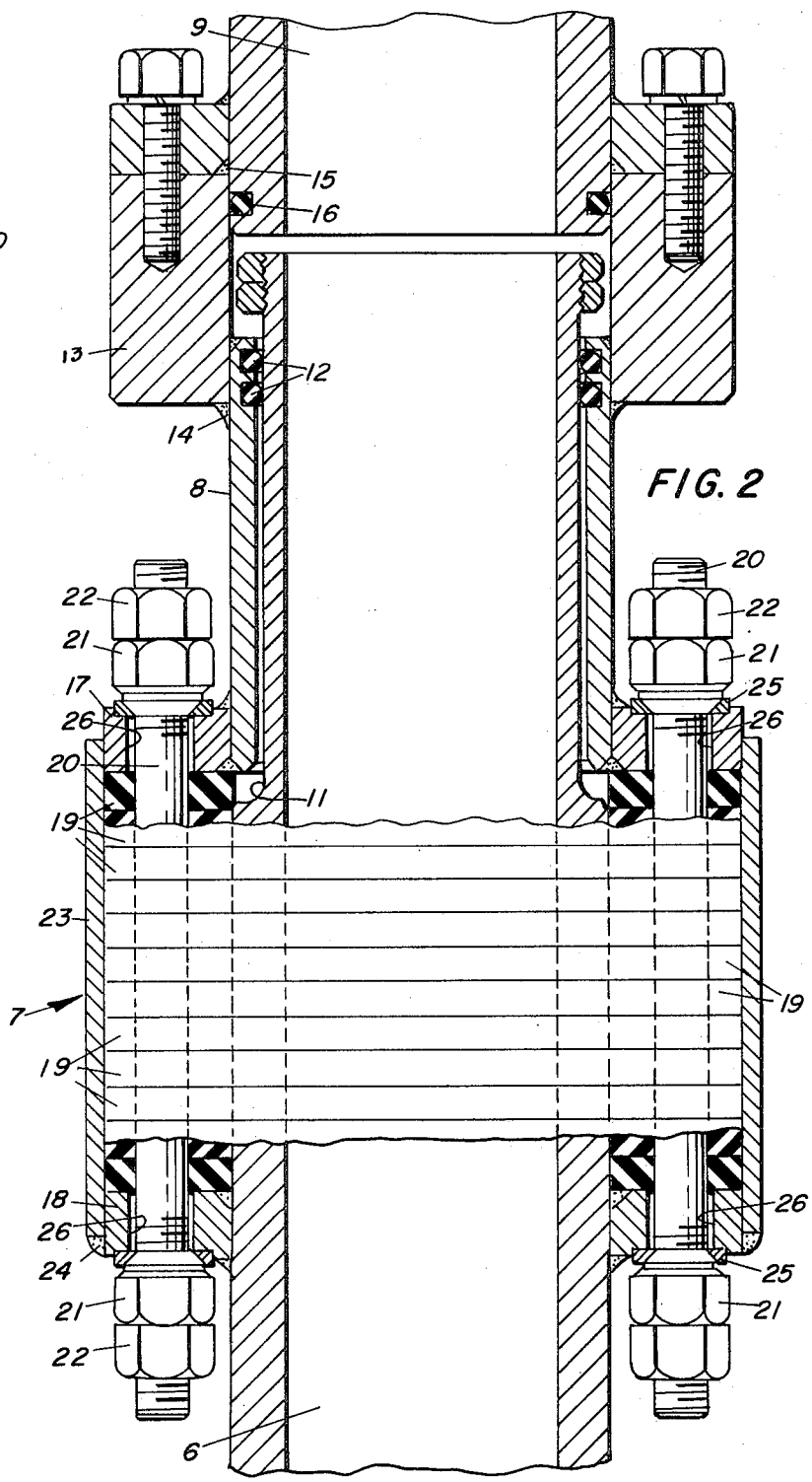

The construction of the torque absorber assembly will be best seen in FIG. 2, where the pump discharge head extension pipe 6 is radially inwardly reduced at its upper end as at 11, to fit within the adapter tube 8 which is connected to and depends from the main discharge line 9. Preferably, the adapter tube 8 and the reduced end 11 of the discharge head extension, when assembled, are of a diameter coinciding with that of the discharge tubing 9 and the pump head extension pipe 6.

The adapter tube 8, which is per se free of mechanical connection to the reduced extension 11 of the pump discharge head but sealed with respect to the latter by sealing rings 12, is secured to a collar 13 which is welded or otherwise fixed to the adapter tube 8 as at 14, and to the main discharge line 9 as at 15. The main discharge line 9 may also be sealed with respect to the collar 13 by a sealing ring 16. Thus, the adapter tube 8 is indirectly fixed to the main discharge line 9, and the reduced extension 11 of the pump discharge line 6 is relatively axially rotatable with respect to the main discharge line 9 and collar 13 and is in substantially co-axial fluid communication with the main discharge line.

The lower end of the adapter tube 8 carries a radially extending flange plate 17 which forms the upper plate of the torsion absorber, as will be later explained. The pump discharge head extension pipe 6 carries a radially extending flange plate 18 which forms the lower plate of the torque absorber assembly, and between these plates are arranged a series of annular rubber-like disc rings 19. Bolts 20, which are threaded at opposite ends to receive tightening nuts 21 and 22, extend through the respective plates and intervening disc rings at annularly spaced intervals for retaining the disc rings in place between the plates and for adjusting the tension or friction between the respective disc rings. Thus, the disc rings 19, through the bolts 20, may be tightened between the end plates 17 and 18 to a degree to allow support of the pump 4 through the discharge lines and to permit limited axial rotational movement of the pump discharge head extension pipe 6 and pump 4 to absorb torque created by operation of the pump.

The torque absorber disc rings 19 may be enclosed within a cylindrical housing 23, which is welded or otherwise secured at its lower end to plate 18, as at 24, the housing being free to rotate at its upper end with respect to the plate 17, so as to permit the required rotational movement between the pump discharge head extension pipe 6 and the main discharge line 9.

It will be noted that the diameter of the disc rings 19 should be sufficient to provide a lever arm sufficient to sustain a minimum of radial movement under very high torsional stress and to allow for increased bore sizes to provide a minimum of frictional loss by reducing velocities to a point compatible with the pumping of very high volumes of oil or water at high pressure. These volumes are presently in the area of 1,000 gallons per minute. It is also necessary to make the diameter of the disc rings large in order to minimize the length of the torque absorber, due to the limited space into which the entire unit is installed and to absorb the torsional stress of horsepowers in the 400 and 500 hp range. The present design is intended to provide a virtually rigid connection at low torque requirements, with a flexible torsional absorption capacity at higher torque requirements, such absorption capability being predetermined by the amount of compression taken on the resilient disc rings 19 by means of torque applied to the bolts 20 which extend through the end plates 17 and 18.

It may be pointed out that the nuts 21 are convex on their lower ends and the coacting washers 25 are machined concave to accommodate movement of the bolts 20. Also, the bolt receiving openings 26 in the plates 17 and 18 are of sufficiently greater diameter than that of the bolts 20 to further accommodate relative movement. That is, the relief between plates 17 and 18 and bolts 20 allows rotational movement to take place without tending to shear the bolts 20.

The disc rings 19 may be formed of rubber or other suitable material having the required resilience and frictional properties for the purpose described.

From the foregoing, it is believed that the invention may be readily understood by those skilled in the art without further description, it being borne in mind that numerous changes may be made in the details disclosed without departing from the spirit of the invention.

I claim:

1. A torque absorber assembly for use in a well pump installation, comprising a pump discharge head extension pipe positioned below and arranged for substantially coaxial communication with a main well discharge pipe, said discharge head extension pipe and said main discharge pipe being capable of limited relative axial rotational movement, vertically spaced upper and lower annular flange plates fixedly connected, respectively, to said main well discharge pipe and said pump discharge head extension pipe, said flange plates surrounding said pipes, respectively, a series of annular, rubber-like disc rings surrounding one of said pipes and concentrically interposed between said upper and lower flange plates in superposed relation, cylindrical housing means connected to one of said flange plates and surrounding said rings for retaining said rings between said plates, and adjustable means for urging said flange plates toward one another, said adjustable means comprising a plurality of bolts extending through said flange plates and disc rings at annularly spaced intervals, and nuts threadedly engaging said bolts adjacent to one of said plates for adjusting the compression applied to said disc rings between said plates, said one pipe extending into the remaining pipe with annular fluid seal means therebetween.

2. A torque absorber assembly as claimed in claim 1, in which said discharge pipe comprises an adapter tube concentrically depending from a main discharge line, said upper plate being secured to said adapter tube at its lower end.

3. A torque absorber assembly as claimed in claim 2, in which said one pipe is said pump discharge head extension pipe, which has its upper end extending into said adapter tube.

4. A torque absorber assembly as claimed in claim 2, in which said adapter tube is connected to said main discharge line by an annular collar.

* * * * *